(12) United States Patent
Ammari et al.

(10) Patent No.: US 9,872,361 B1
(45) Date of Patent: Jan. 16, 2018

(54) NETWORKED LIGHT CONTROL SYSTEM AND METHOD

(71) Applicant: General Electric Company, Schenectady, NY (US)

(72) Inventors: Mohammed Ammari, Lachine (CA); Youcef Chaoua, Lachine (CA); Louis Bacon, Lachine (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/621,121

(22) Filed: Jun. 13, 2017

(51) Int. Cl.
*H05B 37/02* (2006.01)
*H05B 33/08* (2006.01)

(52) U.S. Cl.
CPC ..... *H05B 37/0218* (2013.01); *H05B 33/0854* (2013.01)

(58) Field of Classification Search
CPC ............... H05B 33/08; H05B 33/0854; H05B 33/0842; H05B 33/0875; H05B 37/02; H05B 37/0218; H05B 17/0227; H05B 37/04
See application file for complete search history.

(56) References Cited

U.S. PATENT DOCUMENTS

| | | | |
|---|---|---|---|
| 8,866,392 B2* | 10/2014 | Chen | G08B 15/00 315/152 |
| 9,420,674 B2 | 8/2016 | Hartman et al. | |
| 2011/0043035 A1* | 2/2011 | Yamada | H02J 3/14 307/39 |
| 2012/0086561 A1 | 4/2012 | Llyes et al. | |
| 2012/0321321 A1* | 12/2012 | Riesebosch | H04B 10/116 398/118 |
| 2014/0103814 A1 | 4/2014 | Both | |
| 2015/0220428 A1 | 8/2015 | Simonyi et al. | |

* cited by examiner

*Primary Examiner* — Thai Pham
(74) *Attorney, Agent, or Firm* — Peter T. DiMauro; GE Global Patent Operation

(57) ABSTRACT

A networked light control system includes light sensor circuitry that includes plural light sensors configured to sense an ambient light level, a control unit configured to generate a control signal that activates or deactivates one or more lights in a network of lights based on the ambient light level that is sensed by the light sensor circuitry, and relay logic circuitry configured to open or close a relay or a solid state switch for activating or deactivating the one or more lights based on receipt of the control signal generated by the control unit. The relay logic circuitry is configured to control the relay or the solid-state switch responsive to a failure in the control unit.

20 Claims, 3 Drawing Sheets

NETWORKED LIGHT CONTROL SYSTEM AND METHOD

BACKGROUND

Smart lighting systems include lights disposed in several locations and coupled with one or more smart controllers in a lighting network. The controllers can control which lights are on or off at different times and/or under various light conditions. For example, some light controllers may turn off a light responsive to an ambient light at or near the light rising above a threshold level and/or may turn the light on responsive to the ambient light at or near the light falling below the same threshold or a different threshold. This can allow for lights to automatically turn on at dusk or night and automatically turn off at sunrise or during daylight.

One problem with these systems and controllers can include the inability to turn off networked lights after a failure of the controller or other hardware circuitry in the system. For example, the software running on the controller can crash (e.g., stop working as intended for at least a temporary time period) and prevent the controller from turning off one or more lights during daylight hours. This can result in the consumption of energy to power the lights that is not needed or desired.

BRIEF DESCRIPTION

In one embodiment, a networked light control system includes light sensor circuitry that includes plural light sensors configured to sense an ambient light level, a control unit configured to generate a control signal that activates or deactivates one or more lights in a network of lights based on the ambient light level that is sensed by the light sensor circuitry, and relay logic circuitry configured to open or close a relay or a solid state switch for activating or deactivating the one or more lights based on receipt of the control signal generated by the control unit. The relay logic circuitry is configured to control the relay or the solid-state switch responsive to a failure in the control unit.

In one embodiment, a method for controlling a networked light control system includes sensing an ambient light level using light sensor circuitry that includes plural light sensors, generating a control signal using a control unit that activates or deactivates one or more lights in a network of lights based on the ambient light level that is sensed, opening or closing a relay or solid state switch using relay logic circuitry for activating or deactivating the one or more lights based on receipt of the control signal generated by the control unit, determining a failure in operation of the control unit, and transferring control of the relay or solid state switch to the relay logic circuitry responsive to determining the failure in the operation of the control unit.

In one embodiment, a networked light control system includes light sensor circuitry including a first light sensor configured to sense an ambient light level, a control unit configured to activate or deactivate a light based on the ambient light level that is sensed by the first light sensor, and relay logic circuitry configured to open or close a relay or solid state switch for activating or deactivating the light based on the control signal generated by the control unit. The relay logic circuitry is configured to control the relay or solid state switch responsive to a failure in the control unit.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
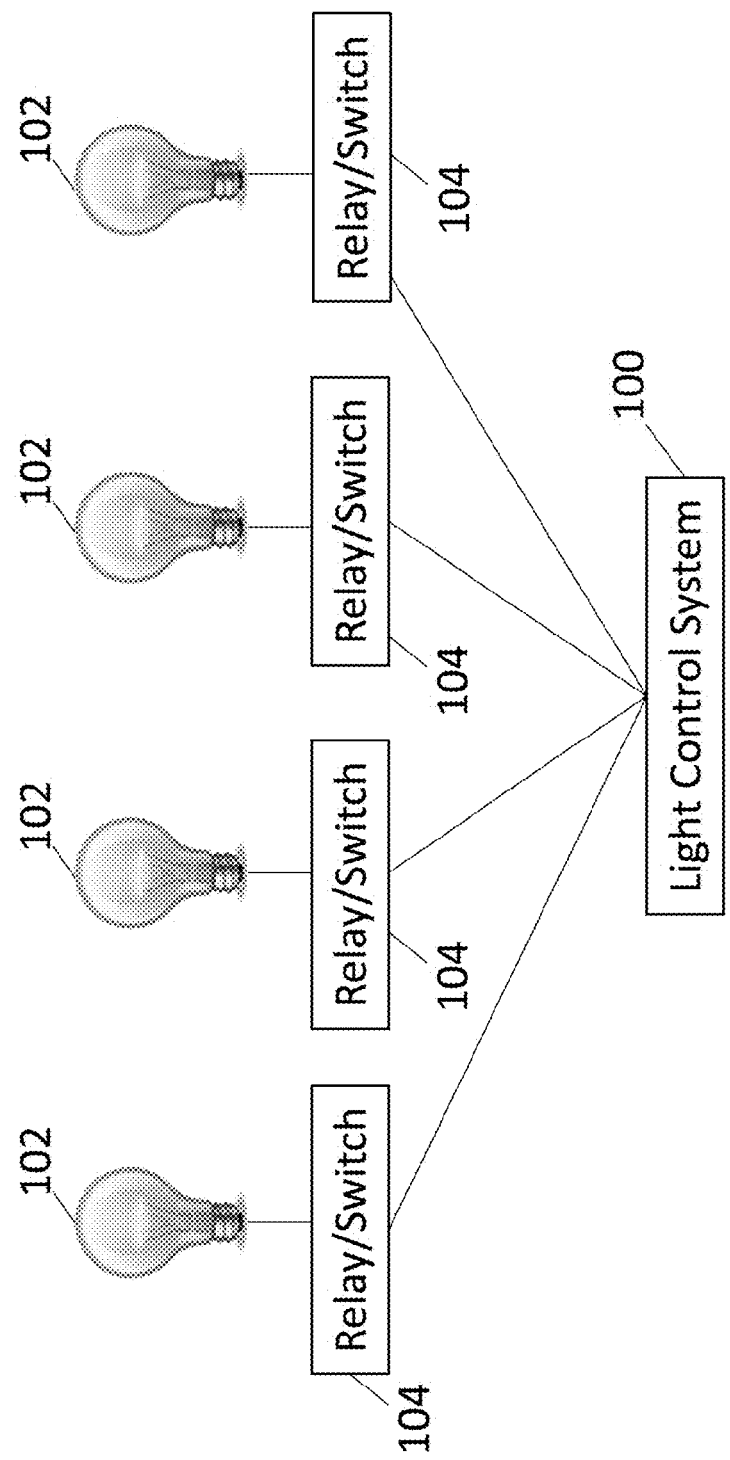
FIG. 1 illustrates one embodiment of a networked light control system.

FIG. 1 illustrates one embodiment of a networked light control system 100. The system 100 is coupled with one or more lights 102 by switching devices 104 ("Relay/Switch" in FIG. 1). The system 100 can be coupled with the switching devices 104 via wired and/or wireless connections. The lights 102 are networked together by the system 100 such that the system 100 can remotely control activation or deactivation of the lights 102 at different locations. For example, the lights 102 may be disposed in different rooms, different floors of the same building, in different buildings, on different streets, in different towns, or the like. The system 100 can individually control which lights 102 are on or off by generating and communicating control signals to the switching devices 104. The switching devices 104 can open to deactivate an associated light 102 (e.g., by disconnecting the light 102 from a power source) and can close to activate the light 102 (e.g., by connecting the light 102 with the power source).

The lights 102 can represent light-generating devices, such as light emitting diodes, incandescent bulbs, fluorescent lights, or the like. The switching devices 104 can represent relays, switches (e.g., solid state switches), or the like. As described below, the system 100 can represent hardware circuitry that includes and/or is connected with one or more processors (e.g., one or more microprocessors, field programmable gate arrays, integrated circuits, etc.).

Figure 2:
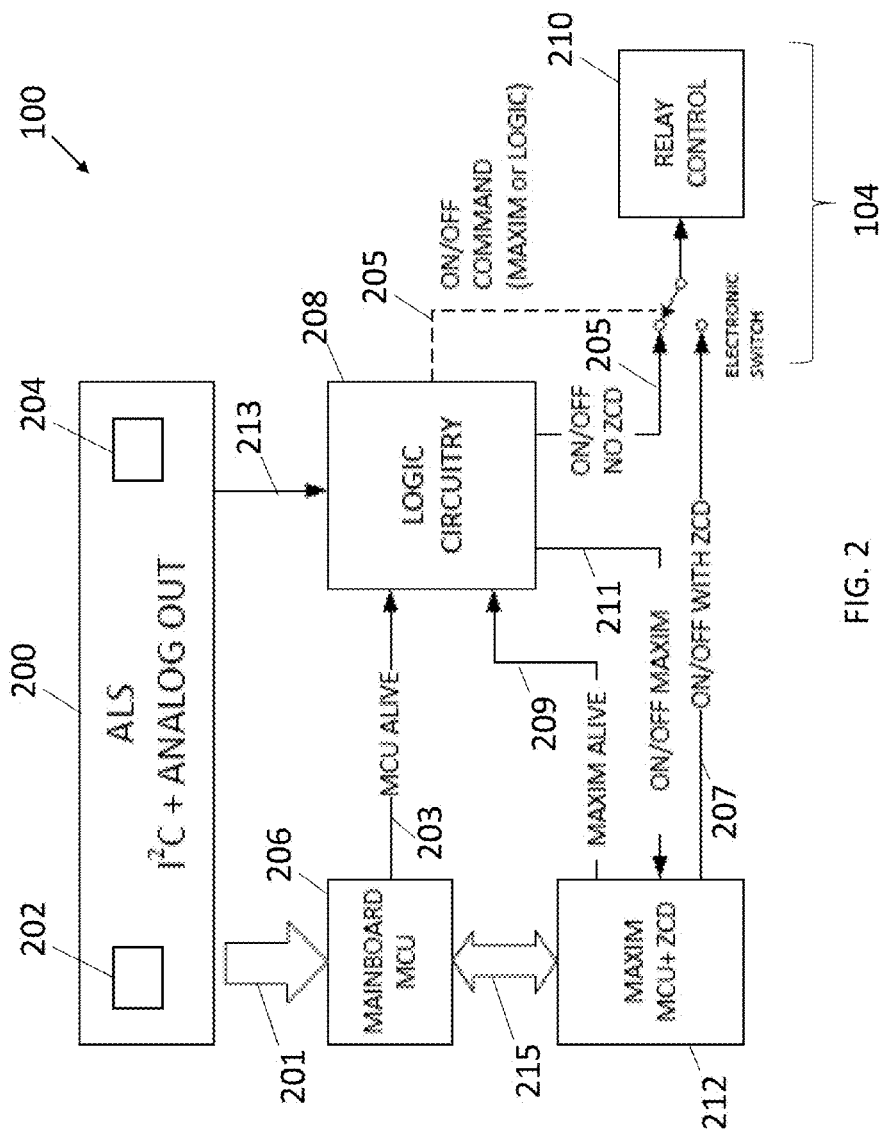
FIG. 2 illustrates a circuit diagram of one embodiment of the networked light control system shown in FIG. 1.

FIG. 2 illustrates a circuit diagram of one embodiment of the networked light control system 100 shown in FIG. 1. The system 100 includes light sensor circuitry 200 ("ALS I$^2$C+ ANALOG OUT" in FIG. 2) that includes one or more light sensors 202, 204. The light sensor circuitry 200 optionally includes one or more integrated circuits that include and/or are connected with one or more processors (e.g., microprocessors, integrated circuits, and/or field programmable gate arrays). As described herein, the light sensor circuitry 200 can operate to improve the operation of the system 100 by ensuring that lights 102 are automatically deactivated responsive to ambient light levels exceeding a designated upper limit even when other software and/or hardware in the system 100 fails.

The light sensor circuitry 200 can include one or more photocells as the light sensors 202, 204. In one embodiment, the light sensor circuitry 200 includes a digital light sensor 202 and an analog light sensor 204. One light sensor 202 can be referred to as a primary light sensor that senses levels of ambient light during a normal or non-fault state or mode of operation of the system 100. The other light sensor 204 can be referred to as a backup and/or redundant light sensor that senses the levels of ambient light during a fault state or mode of operation of the system 100. Optionally, the light sensor 204 can be the primary sensor while the light sensor 202 is the secondary sensor.

The system 100 also includes a control unit 206 ("MAINBOARD MCU" in FIG. 2) that controls operation of the lights 102 (shown in FIG. 1) by controlling the state of the switching devices 104 (only one shown in FIG. 1). The control unit 206 represents hardware circuitry that includes and/or is connected with one or more processors. The circuitry and/or processors may be specially programmed to individually control which lights 102 are on and which lights 102 are off.

The circuitry 200 can communicate an ambient level signal 201 that is communicated to the control unit 206. This signal 201 can indicate or represent the ambient amount of light sensed by the sensor 202. The control unit 206 can communicate a control signal 215 to a crossing detection unit 212 ("MAXIM MCU+ZCD" in FIG. 2). The signal 215 can be the same as the signal 201, or can represent the amount of ambient light sensed by the sensor 202. The detection unit 212 represents hardware circuitry that includes and/or is connected with one or more processors.

The detection unit 212 controls the switching device 104 so that the switching device 104 closes or opens based on the ambient light level sensed by the sensor 202 and/or 204 changing in one or more designated ways. For example, the signal 201 that is output by the sensor 202 can be a voltage or current having a magnitude and sign (e.g., positive or negative) that indicates the ambient light level sensed by the sensor 202. Larger, positive voltages or currents in the signal 201 can indicate more ambient light detected by the sensor 202, while smaller or negative voltages or currents in the signal 201 can indicate less or no ambient light detected by the sensor 202.

The detection unit 212 can receive the signal 201 from the sensor 202 and/or the signal 215 from the control unit 206, and can monitor the signal 201 and/or 215 to determine when the voltage or current crosses zero. The signal 201 and/or 215 may cross zero (also referred to as a zero crossing) when the voltage or current changes from a positive value to a negative value, or when the voltage or current changes from a negative value to a positive value.

The detection unit 212 can generate a control signal 207 ("ON/OFF WITH ZCD" in FIG. 2) responsive to detecting a zero crossing and/or ambient light that dictates changing a state of the switching device 104. This control signal 207 can instruct the switching device 104 to change states, such as switch from being open to closing or from being closed to opening. Use of the detection unit 212 can extend the useful life of the switching device 104 relative to not using the detection unit 212.

The detection unit 212 can communicate a status signal 209 ("MAXIM ALIVE" in FIG. 2) with relay logic circuitry 208. Although the circuitry 208 is referred to as relay logic circuitry, the circuitry 208 optionally can control switches other than relays, such as solid state switches. The relay logic circuitry 208 includes hardware circuitry that includes and/or is connected with one or more processors.

This signal 209 can inform the logic circuitry 208 that the detection unit 212 is operational (e.g., software operating on the detection unit 212 has not crashed and that there are no hardware faults in the detection unit 212). The logic circuitry 208 can determine that the detection unit 212 is no longer operational (e.g., has failed) due to a failure of the logic circuitry 208 to receive the signal 209.

The logic circuitry 208 similarly can determine that the control unit 206 is no longer operational due to a failure of the logic circuitry 208 to receive a signal 203 ("MCU ALIVE" in FIG. 2) from the control unit 206. The control signal 203 indicates that the control unit 206 is operational (e.g., the software operating on the control unit 206 is working and has not crashed).

Responsive to determining that the control unit 206 is not operational (e.g., due to a software crash on the control unit 206, hardware failure of the control unit 206, or the like), the logic circuitry 208 can examine an ambient level signal 213 communicated from the second light sensor 204. This signal 213 can be examined as a redundant, backup measurement of the amount of ambient light in the event that the sensor 202, control unit 206, and/or detection unit 212 is no longer operating as intended or designed. For example, if the software operating on the control unit 206 crashes or the hardware of the sensor 202, control unit 206 fails or is damaged, the signal 203 may no longer be communicated from the control unit 206 to the logic circuitry 208 and/or the signal 203 can indicate the fault with the control unit 206. The logic circuitry 208 can then examine the ambient light level(s) detected by the sensor 204 to determine whether to open or close the switching device 104.

For example, responsive to determining a fault with the control unit 206 and responsive to determining that the ambient light measured by the sensor 204 indicates a need to change a state of the switching device 104, the logic circuitry 208 can generate and communicate a control signal 211 ("ON/OFF MAXIM" in FIG. 2) to the detection unit 212. This control signal 211 can direct the detection unit 212 to send the signal 207 to the switching device(s) 104 to change the state of the switching device(s) 104. If the control unit 206 is not working and the ambient light sensed by the sensor 204 is at or below the first designated threshold, the logic circuitry 208 communicates the signal 211 to the detection unit 212, which causes the detection unit 212 to communicate the signal 207 to the switching device 104, which closes the switching device 104 to turn an associated light 102 on.

Conversely, responsive to the control unit 206 not working and the ambient light level sensed by the light sensor 204 exceeding the second designated threshold (e.g., 24 lux), the logic circuitry 208 can generate the control signal 211 that is communicated to the detection unit 212, which causes the detection unit 212 to send the signal 207 to the switching device 104 to open the switching devices 104 and turn off the associated light 102.

The logic circuitry 208 can detect a failure in the detection unit 212 (e.g., failure due to a hardware fault and/or a software crash) based on the signal 209 not being received by the logic circuitry 208 and/or based on a change in the signal 209. The logic circuitry 208 can continue monitoring the ambient light levels measured by the second sensor 204 and communicated in the signal 213 to determine whether to turn the light 102 on or off. The logic circuitry 208 can bypass the failed detection unit 212 by communicating a control signal 205 ("ON/OFF COMMAND" in FIG. 2) to the switching device 104. This signal 205 may not be communicated through or via the control unit 206 and/or the detection unit 212 in one embodiment. The logic circuitry 208 can communicate the signal 205 to close the switching device 104 and turn the light 102 on responsive to the ambient light sensed by the sensor 204 being at or below the first threshold. The logic circuitry 208 can communicate the signal 205 to open the switching device 104 and turn the light 102 off responsive to the ambient light sensed by the sensor 204 being above the second threshold.

This alternate path for the logic circuitry 208 to determine when to turn the light(s) 102 on or off can prevent at least some software and/or hardware failures within the system 100 from preventing the system 100 from turning the light(s) 102 off during daylight and/or from turning the light(s) 102 on during nighttime. The system 100 can continue to operate by keeping the lights 102 on when ambient levels of light are low or nonexistent in order to illuminate desired locations, and to turn the lights 102 off when the ambient levels of light are high in order to prevent unnecessarily consuming electric energy.

Figure 3:
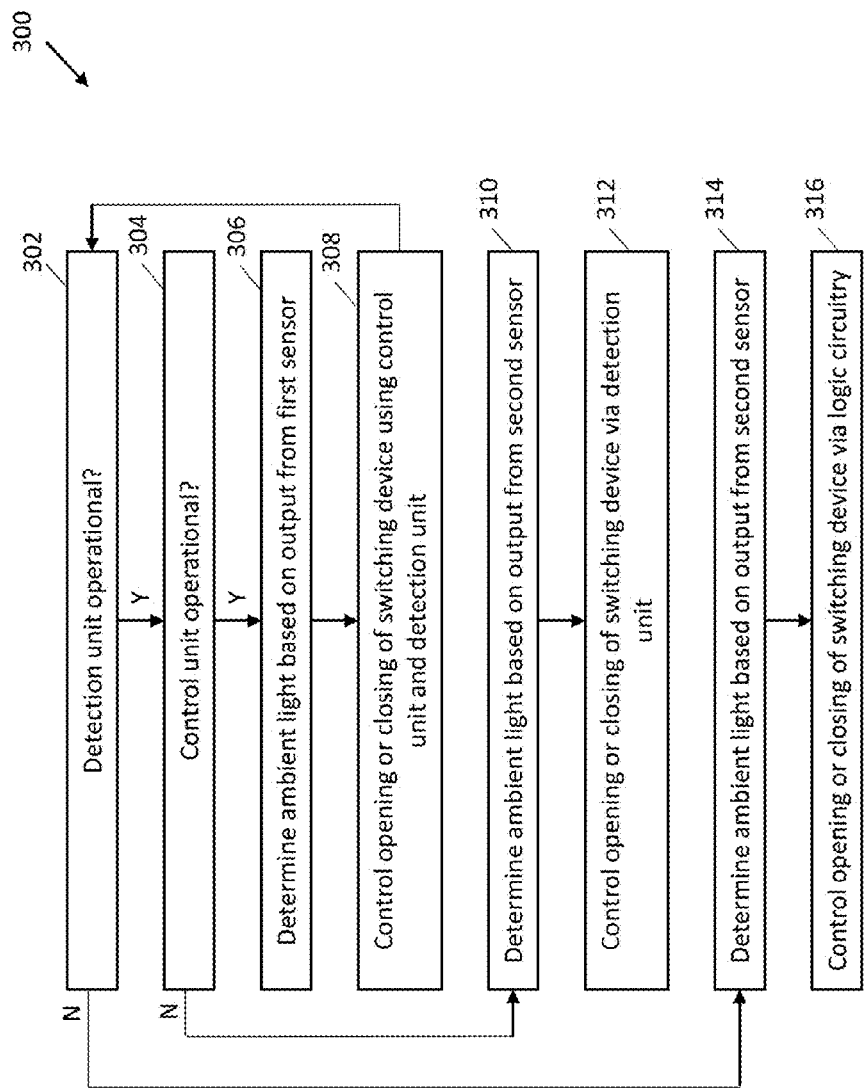
FIG. 3 illustrates a flowchart of one embodiment of a method for controlling a networked light control system.

FIG. 3 illustrates a flowchart of one embodiment of a method 300 for controlling a networked light control system. The method 300 can represent operations performed by the system 100, such as operations performed by the control unit 206, detection unit 212, and/or the logic circuitry 208 as described above. In one embodiment, a person of ordinary skill in the art can use the flowchart of the method 300 to write one or more software applications that direct the operations performed by the control unit 206, detection unit 212, and/or the logic circuitry 208 as described above.

At 302, a determination is made as to whether the crossing detection unit 212 is operational. For example, the logic circuitry 208 can determine if the signal 209 is being received or has been received by the logic circuitry 208 within a designated time period, such as thirty milliseconds, one second, sixty seconds, five minutes, or the like. This can indicate that the detection unit 212 is operational. Optionally, the logic circuitry 208 can examine the signal 209 to determine if the signal 209 indicates that the detection unit 212 is operational. If the detection unit 212 is operational, then flow of the method 300 can proceed toward 304. If the detection unit 212 is not operational, then flow of the method 300 can proceed toward 314.

At 304, a determination is made as to whether the control unit 206 is operational. For example, the logic circuitry 208 can determine if the signal 203 is being received or has been received by the logic circuitry 208 within a designated time period, such as thirty milliseconds, one second, sixty seconds, five minutes, or the like. This can indicate that the control unit 206 is operational. Optionally, the logic circuitry 208 can examine the signal 203 to determine if the signal 203 indicates that the control unit 206 is operational. If the control unit 206 is operational, then flow of the method 300 can proceed toward 306. If the control unit 206 is not operational, then flow of the method 300 can proceed toward 310.

At 306, the ambient light can be determined using the first light sensor 202. The first light sensor 202 can communicate the signal 201 to the control unit 206, which determines whether to close or open the switching device(s) 104 to turn corresponding lights 102 on or off. The control unit 206 and/or detection unit 212 determine whether the sensed ambient light indicates that one or more lights 102 are to be turned on or off. For example, the control unit 206 can examine the ambient light sensed by the first sensor 202 and determine whether the ambient light is at or below the first designated threshold or exceeds the second designated threshold. The detection unit 212 also can determine if the voltage or current output by the first sensor 202 experiences a zero crossing. If the ambient light is at or below the first designated threshold and/or a zero crossing is detected, then the control unit 206 can determine that the light(s) 102 are to be turned on due to the ambient light being dim or dark. If the ambient light exceeds the second designated threshold and/or a zero crossing is detected, then the control unit 206 can determine that the light(s) 102 are to be turned off due to the ambient light being bright.

At 308, the light(s) are turned on or off as determined by the control unit 206 and/or detection unit 212. For example, the detection unit 212 can communicate the signal 207 to the switching device 104, which opens or closes the switching device 104 as determined at 306. If the ambient light sensed by the first sensor 202 at 306 does not indicate that the state of the switching device 104 is to be changed (e.g., the ambient light has not increased enough to turn the light 102 off or the ambient light has not decreased enough to turn the light 102 on), then the switching device 104 is not opened from a closed state or closed from an open state at 308. Flow of the method 300 can then return toward 302, or may terminate.

At 310, the ambient light can be determined using the second light sensor 204. For example, responsive to determining that the control unit 206 is not operational at 304, the logic circuitry 208 can determine the ambient light level from the backup, redundant sensor 204 via the signal 213. The logic circuitry 208 and/or detection unit 212 determine whether the sensed ambient light indicates that one or more lights 102 are to be turned on or off. For example, the logic circuitry 208 can examine the ambient light sensed by the second sensor 204 and determine whether the ambient light is at or below the first designated threshold or exceeds the second designated threshold. The detection unit 212 also can determine if the voltage or current output by the first sensor 202 experiences a zero crossing. If the ambient light is at or below the first designated threshold and/or a zero crossing is detected, then the logic circuitry 208 can determine that the light(s) 102 are to be turned on due to the ambient light being dim or dark. If the ambient light exceeds the second designated threshold and/or a zero crossing is detected, then the logic circuitry 208 can determine that the light(s) 102 are to be turned off due to the ambient light being bright.

At 312, the light(s) are turned on or off as determined by the logic circuitry 208 and/or detection unit 212. For example, the detection unit 212 can communicate the signal 207 to the switching device 104, which opens or closes the switching device 104 as determined at 306. If the ambient light sensed by the second sensor 204 at 310 does not indicate that the state of the switching device 104 is to be changed (e.g., the ambient light has not increased enough to turn the light 102 off or the ambient light has not decreased enough to turn the light 102 on), then the switching device 104 is not opened from a closed state or closed from an open state at 308. Flow of the method 300 can then return toward 302, or may terminate.

At 314, the ambient light can be determined using the second light sensor 204. For example, responsive to determining that the detection unit 208 is not operational at 302, the logic circuitry 208 can determine the ambient light level from the backup, redundant sensor 204 via the signal 213. The logic circuitry 208 can determine whether the sensed ambient light indicates that one or more lights 102 are to be turned on or off, without use of the detection unit 212. For example, the logic circuitry 208 can examine the ambient light sensed by the second sensor 204 and determine whether the ambient light is at or below the first designated threshold or exceeds the second designated threshold. If the ambient light is at or below the first designated threshold (and without regard to the analysis or detection of any zero crossing by the detection unit 212), the logic circuitry 208 can determine that the light(s) 102 are to be turned on due to the ambient light being dim or dark. If the ambient light exceeds the second designated threshold (and without regard to the analysis or detection of any zero crossing by the detection unit 212), the logic circuitry 208 can determine that the light(s) 102 are to be turned off due to the ambient light being bright.

At 316, the light(s) are turned on or off as determined by the logic circuitry 208 without input or analysis by the detection unit 212. For example, the logic circuitry 208 can communicate the signal 205 to the switching device 104, which opens or closes the switching device 104 as determined at 306. If the ambient light sensed by the second sensor 204 does not indicate that the state of the switching device 104 is to be changed (e.g., the ambient light has not increased enough to turn the light 102 off or the ambient light has not decreased enough to turn the light 102 on), then the switching device 104 is not opened from a closed state or closed from an open state at 308. Flow of the method 300 can then return toward 302, or may terminate.

In one embodiment, a networked light control system includes light sensor circuitry that includes plural light sensors configured to sense an ambient light level, a control unit configured to generate a control signal that activates or deactivates one or more lights in a network of lights based on the ambient light level that is sensed by the light sensor circuitry, and relay logic circuitry configured to open or close a relay or a solid state switch for activating or deactivating the one or more lights based on receipt of the control signal generated by the control unit. The relay logic circuitry is configured to control the relay or the solid-state switch responsive to a failure in the control unit.

Optionally, the control unit and the relay logic circuitry are configured to open the relay or solid state switch and deactivate the one or more lights during daylight.

Optionally, the relay logic circuitry is configured to take control of the relay or solid state switch responsive to the control unit keeping the relay or solid state switch closed or closing the relay or solid state switch during nighttime.

Optionally, the light sensors in the light sensor circuitry include a primary light sensor and a redundant backup light sensor, the control unit is configured to generate the control signal based on the ambient light sensed by the primary light sensor, and the relay logic circuitry is configured to control the relay or solid state switch based on the ambient light sensed by the redundant backup light sensor.

Optionally, the primary light sensor is a digital or analog light sensor and the redundant backup light sensor is a digital or analog light sensor.

Optionally, the relay logic circuitry is configured to control the relay or the solid-state switch in response to the control unit and the relay logic circuitry keeping the relay or solid state switch in a closed position while the ambient light level that is sensed by the light sensor circuitry exceeds an upper designated threshold.

Optionally, the control unit and the relay logic circuitry are configured to open the relay or solid state switch from the closed position while the ambient light level that is sensed by the light sensor circuitry is at or below the upper designated threshold.

Optionally, the relay logic circuitry is configured to control the relay or solid state switch responsive to a software crash or hardware failure of the control unit.

In one embodiment, a method for controlling a networked light control system includes sensing an ambient light level using light sensor circuitry that includes plural light sensors, generating a control signal using a control unit that activates or deactivates one or more lights in a network of lights based on the ambient light level that is sensed, opening or closing a relay or solid state switch using relay logic circuitry for activating or deactivating the one or more lights based on receipt of the control signal generated by the control unit, determining a failure in operation of the control unit, and transferring control of the relay or solid state switch to the relay logic circuitry responsive to determining the failure in the operation of the control unit.

Optionally, generating the control signal includes communicating the control signal to the relay logic circuitry to direct the relay logic circuitry to open the relay or solid state switch and deactivate the one or more lights during daylight.

Optionally, transferring control of the relay or solid state switch to the relay logic circuitry occurs responsive to the control unit keeping the relay or solid state switch closed or closing the relay or solid state switch during nighttime.

Optionally, sensing the ambient light level is performed using a primary light sensor and a redundant backup light sensor and the control signal is generated based on the ambient light sensed by the primary light sensor. The method also can include controlling the relay or solid state switch using the relay logic circuitry based on the ambient light sensed by the redundant backup light sensor.

Optionally, the failure in the operation of the control unit is determined responsive to the control unit keeping the relay or solid state switch in a closed position while the ambient light level that is sensed by the light sensor circuitry exceeds an upper designated threshold.

Optionally, the method also can include opening the relay or solid state switch from the closed position using the control unit responsive to the ambient light level that is sensed by the light sensor circuitry being at or below the upper designated threshold.

Optionally, the failure in the operation of the control unit occurs responsive to a software crash of the control unit.

In one embodiment, a networked light control system includes light sensor circuitry including a first light sensor configured to sense an ambient light level, a control unit configured to activate or deactivate a light based on the ambient light level that is sensed by the first light sensor, and relay logic circuitry configured to open or close a relay or solid state switch for activating or deactivating the light based on the control signal generated by the control unit. The relay logic circuitry is configured to control the relay or solid state switch responsive to a failure in the control unit.

Optionally, the control unit is configured to open the relay or solid state switch and deactivate the light during daylight.

Optionally, the relay logic circuitry is configured to take control of the relay or solid state switch responsive to the control unit keeping the relay or solid state switch closed or closing the relay or solid state switch during daylight.

Optionally, the light sensor circuitry also includes a second light sensor, the control unit is configured to generate the control signal based on the ambient light sensed by the first light sensor, and the relay logic circuitry is configured to control the relay or solid state switch based on the ambient light sensed by the second light sensor.

Optionally, the first light sensor is a digital light sensor and the second light sensor is an analog light sensor.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A networked light control system comprising:
   light sensor circuitry that includes plural light sensors configured to sense an ambient light level;
   a control unit configured to generate a control signal that activates or deactivates one or more lights in a network of lights based on the ambient light level that is sensed by the light sensor circuitry; and
   relay logic circuitry configured to open or close a relay or a solid-state switch for activating or deactivating the one or more lights based on receipt of the control signal generated by the control unit,
   wherein the relay logic circuitry is configured to control the relay or the solid-state switch responsive to a failure in the control unit.

2. The system of claim 1, wherein the control unit is configured to open the relay or solid state switch and deactivate the one or more lights during daylight.

3. The system of claim 2, wherein the relay logic circuitry is configured to take control of the relay or solid state switch responsive to the control unit keeping the relay or solid state switch closed or closing the relay or solid state switch during nighttime.

4. The system of claim 1, wherein the light sensors in the light sensor circuitry include a primary light sensor and a redundant backup light sensor, the control unit configured to generate the control signal based on the ambient light sensed by the primary light sensor, the relay logic circuitry configured to control the relay or solid state switch based on the ambient light sensed by the redundant backup light sensor.

5. The system of claim 4, wherein the primary light sensor is a digital or analog light sensor and the redundant backup light sensor is a digital or analog light sensor.

6. The system of claim 1, wherein the relay logic circuitry is configured to control the relay or the solid-state switch in response to the control unit keeping the relay or solid state switch in a closed position while the ambient light level that is sensed by the light sensor circuitry exceeds an upper designated threshold.

7. The system of claim 6, wherein the control unit is configured to open the relay or solid state switch from the closed position while the ambient light level that is sensed by the light sensor circuitry is at or below the upper designated threshold.

8. The system of claim 1, wherein the relay logic circuitry is configured to control the relay or solid state switch responsive to a software crash or hardware failure of the control unit.

9. A method for controlling a networked light control system, the method comprising:
   sensing an ambient light level using light sensor circuitry that includes plural light sensors;
   generating a control signal using a control unit that activates or deactivates one or more lights in a network of lights based on the ambient light level that is sensed;
   opening or closing a relay or solid state switch using relay logic circuitry for activating or deactivating the one or more lights based on receipt of the control signal generated by the control unit;
   determining a failure in operation of the control unit; and
   transferring control of the relay or solid state switch to the relay logic circuitry responsive to determining the failure in the operation of the control unit.

10. The method of claim 9, wherein generating the control signal includes communicating the control signal to the relay logic circuitry to direct the relay logic circuitry to open the relay or solid state switch and deactivate the one or more lights during daylight.

11. The method of claim 10, wherein transferring control of the relay or solid state switch to the relay logic circuitry occurs responsive to the control unit keeping the relay or solid state switch closed or closing the relay or solid state switch during nighttime.

12. The method of claim 9, wherein sensing the ambient light level is performed using a primary light sensor and a redundant backup light sensor, the control signal is generated based on the ambient light sensed by the primary light sensor, and further comprising controlling the relay or solid state switch using the light sensor circuitry based on the ambient light sensed by the redundant backup light sensor.

13. The method of claim 9, wherein the failure in the operation of the control unit is determined responsive to the control unit keeping the relay or solid state switch in a closed position while the ambient light level that is sensed by the light sensor circuitry exceeds an upper designated threshold.

14. The method of claim 13, further comprising opening the relay or solid state switch from the closed position using the control unit and the relay logic circuitry responsive to the ambient light level that is sensed by the light sensor circuitry being at or below the upper designated threshold.

15. The method of claim 9, wherein the failure in the operation of the control unit occurs responsive to a software crash of the control unit.

16. A networked light control system comprising:
   light sensor circuitry including a first light sensor configured to sense an ambient light level;

a control unit configured to activate or deactivate a light based on the ambient light level that is sensed by the first light sensor; and relay logic circuitry configured to open or close a relay or solid state switch for activating or deactivating the light based on the control signal generated by the control unit, wherein the relay logic circuitry is configured to control the relay or solid state switch responsive to a failure in the control unit.

17. The system of claim 16, wherein the control unit is configured to open the relay or solid state switch and deactivate the light during daylight.

18. The system of claim 17, wherein the relay logic circuitry is configured to take control of the relay or solid state switch responsive to the control unit keeping the relay or solid state switch closed or closing the relay or solid state switch during nighttime.

19. The system of claim 16, wherein the light sensor circuitry also includes a second light sensor, the control unit configured to generate the control signal based on the ambient light sensed by the first light sensor, the relay logic circuitry configured to control the relay or solid state switch based on the ambient light sensed by the second light sensor.

20. The system of claim 19, wherein the first light sensor is a digital or analog light sensor and the second light sensor is an analog or digital light sensor.

* * * * *